United States Patent [19]
Zajacek et al.

[11] 3,895,054

[45] July 15, 1975

[54] PROCESS FOR THE MANUFACTURE OF URETHANES

[75] Inventors: John G. Zajacek, Strafford; John J. McCoy, Media, both of Pa.; Karl E. Fuger, Allschwill, Switzerland

[73] Assignee: Atlantic Richfield Company, Philadelphia, Pa.

[22] Filed: June 21, 1973

[21] Appl. No.: 372,458

Related U.S. Application Data

[63] Continuation-in-part of Ser. No. 284,872, Aug. 30, 1972, abandoned.

[52] U.S. Cl........ 260/471 C; 260/468 E; 260/482 C
[51] Int. Cl............................................ C07c 125/06
[58] Field of Search ......... 260/471 C, 468 E, 482 C

[56] References Cited
UNITED STATES PATENTS
3,338,956   8/1967   Mountfield..................... 260/471 C

*Primary Examiner*—Anton H. Sutto
*Assistant Examiner*—L. A. Thaxton
*Attorney, Agent, or Firm*—John C. Martin, Jr.

[57] ABSTRACT

A process for the manufacture of urethanes and the optional co-production of amines by reacting at elevated temperatures and pressures an organic compound containing at least one hydroxyl group with carbon monoxide and a nitrogenous organic compound containing at least one non-cyclic group, in which a nitrogen atom is directly attached to a single carbon atom and is also attached through a double bond to an oxygen or another nitrogen atom, in the presence of an active amount of a catalyst selected from the group consisting of selenium, sulfur, compounds containing selenium, sulfur compounds and mixtures thereof and a base and/or water.

18 Claims, No Drawings

PROCESS FOR THE MANUFACTURE OF URETHANES

CROSS REFERENCE TO RELATED APPLICATIONS

This application is a continuation-in-part application of application Ser. No. 284,872, filed Aug. 30, 1972, entitled PROCESS FOR THE MANUFACTURE OF URETHANES, and now abandoned.

FIELD OF THE INVENTION

The present invention relates to a process for the manufacture of urethanes (carbamic acid esters) and the coproduction of amines and, more particularly, to a process for the manufacture of urethanes by reaction of a compound containing a hydroxyl group, carbon monoxide and a nitrogeneous compound under elevated temperature and pressure conditions in the presence of catalyst and base and/or water.

BACKGROUND OF THE INVENTION

In the past commercial needs for urethanes were satisfied, at least in part, by reacting an isocyanate with a compound containing a hydroxyl group under elevated temperature conditions. Expense of the isocyanate starting compounds and toxicity problems have caused new methods to be sought for the commercial production of urethanes.

U.S. letters Pat. Nos. 3,338,956 and 3,448,140, for example, have proposed that the manufacture of urethanes be accomplished by reacting an organic compound containing at least one hydroxyl group with carbon monoxide and a nitrogenous compound under superatmospheric pressure and elevated temperature conditions in the presence of a catalyst such as Cr, Mo, W, Mn, Fe, Co, Ni, Ru, Rh, Os and Ir compounds. Although the processes described by these patents employ low cost nitrogenous compounds as starting materials, various factors, including relatively low product yields, long reaction times and high pressure have kept the processes from being economical for obtaining urethanes of high purity on a commercial basis. Among the problems involved with these prior art processes is the fact that many of the suggested catalysts are expensive and difficult to separate from the desired urethane products. Unless the catalyst can be separated for re-use, catalyst loss generally tends to make the expense of using the process prohibitive for commercial purposes. Furthermore, the absence of catalyst separation results in metal contamination of the urethane products.

SUMMARY OF THE INVENTION

An object of the present invention is to provide an improved process for the preparation of urethanes.

Another object of the invention is to provide a process for the manufacture of urethanes in high purity at improved yields and reproducibility by reacting a compound containing a hydroxyl group, carbon monoxide and a nitrogenous compound in the presence of catalyst, base and/or water at a relatively low temperature and pressure.

A further object of the present invention is to provide a process for obtaining high yields of urethanes from the reaction of a compound containing a hydroxyl group, carbon monoxide, and a nitrogenous compound by using selenium, sulfur or compounds thereof as catalyst.

Still another object of the present invention is to provide a process for the production of urethanes and the co-production of amines which is commercially practical and economical.

Yet another object of the present invention is to provide a process for the production of urethanes which is not complicated by toxicity problems.

These and other objects of the invention will be apparent from the following description of the process in accordance with the present invention in which an organic compound containing at least one hydroxyl group is reacted with carbon monoxide and a nitrogenous compound at an elevated temperature and pressure in the presence of a catalyst comprising sulfur, selenium, a sulfur compound, a selenium compound or mixtures thereof. The process for the production of urethanes is normally carried out in the presence of a base and can also be conducted in the presence of a solvent. It has further been found that the presence of water either in place of or in addition to the base can result in an improvement in the yield of the desired urethane products.

DESCRIPTION OF THE PREFERRED EMBODIMENTS

Compounds containing a hydroxyl group suitable for use in the process of the present invention include mono or polyhydric alcohols containing primary, secondary or tertiary hydroxyl groups as well as mono- and polyhydric phenols. Mixtures of these compounds can also be used. The alcohols can be aliphatic or aromatic and can bear other substituents in addition to hydroxyl groups, but the substituents should, except as hereinafter described, preferably be non-reactive with carbon monoxide under the process conditions.

Generally, the hydroxyl group-containing compounds conform with one or other of the general formulae $R(OH)_n$ and $R'(OH)_n$ wherein $n$ is 1 or more and preferably from 1 to 3, R is an optionally substituted aliphatic, cycloaliphatic or araliphatic group, preferably containing from 1 to 20 carbon atoms, R' is an aromatic group containing one or more benzenoid rings and preferably not more than 3 rings which can be fused or joined by single valency bonds, directly or through bridging groups which can be, for example, oxygen, nitrogen or sulfur atoms or sulfoxide, sulfone, amine, amide, or carbonyl groups, or alkylene groups in which, if desired, the carbon chain can be interrupted, by for example, oxygen or sulfur atoms, sulfoxide, sulfone or carbonyl groups, for example, methylene, oxymethylene, dimethylene sulfone or dimethylene ketone groups.

The group R can be alkyl, cycloalkyl, alkylene, cycloalkylene or aralkyl and the main carbon chain can if desired be interrupted, for example by oxygen, nitrogen or sulfur atoms, sulfoxide, sulfone, amine, amide, carbonyl or carboxylic ester groups. The main chain can bear as substituents, for example, alkyl, alkoxy, aryl or aryloxy groups normally containing less than 10 carbon atoms. Especially suitable compounds of the formula $R(OH)_n$ are monohydric alcohols such as methyl, ethyl, n- and sec-propyl, n-, iso, and tert-butyl, amyl, hexyl, lauryl, cetyl, benzyl, chlorobenzyl and methoxybenzyl alcohols as well as diols such as ethylene glycol, diethylene glycol, propylene glycol and dipropylene glycol, triols such as glycerol, trimethylol propane, hexanetriol, tetrols such as pentaerythritol and the ethers of such polyols providing that at least one OH group remains unetherified. The etherifying group in such ether alcohols normally contains up to 10 carbon atoms and is preferably an alkyl, cycloalkyl or aralkyl group which can be substituted, for example, a halogeno alkyl group. Especially suitable compounds of the formula $R(OH)_n$ are lower alkanols. Preferred compounds are methanol, ethanol, n-propanol, isopropanol, butanol, sec-butanol, isobutanol, ethylene glycol, glycerol and trimethylol propane.

The phenolic compounds of the general formula $R'(OH)_n$ can carry substituents in the benzenoid rings, for example, alkyl and alkoxy groups containing up to 10 carbon atoms and halogen atoms. Suitable mono and polyhydric phenols include phenol, chlorophenol, methyl, ethyl, butyl and alkyl phenols, catechol, resorcinol, quinol, 4,4'-dihydroxydiphenylmethane, naphthols, chloronaphthols, methyl, ethyl, butyl and octyl naphthols, anthranols, chloroanthranols, methyl, ethyl, butyl and octyl anthranols, phenanthrols, chlorophenanthrols, methyl, ethyl, butyl and octyl phenanthrols, pyrogallol, phloroglucinol, hydroxyquinol and the ethers of the polyhydroxyphenols providing at least one OH remains unetherified. The etherifying group in such ethers normally contains up to 10 carbon atoms and is preferably an alkyl, cycloalkyl or aralkyl group which can be substituted, for example, a halogenoalkyl group. Among the above mentioned aromatic compounds phenol, chlorophenol, octylphenol, 4,4'-dihydroxydiphenylmethane, naphthols, anthranols and phenanthrols are particularly preferred and especially phenol itself.

Suitable nitrogenous compounds are those containing at least one non-cyclic group in which a nitrogen atom is directly attached to a single carbon atom and through a double bond to oxygen or another nitrogen atom. Such compounds include organic nitro, nitroso, azo and azoxy compounds generally containing up to 24 carbon atoms, of which the organic nitro compounds are generally preferred and the nitroaromatic and tertiary nitroaliphatic compounds are most preferred.

Nitro compounds for use in the process include mononitro compounds such as nitrobenzene, alkyl and alkoxy nitrobenzenes wherein the alkyl group contains up to 10 carbon atoms, aryl and aryloxy nitrobenzenes, wherein the aryl group is phenyl, tolyl, xylyl, naphthyl, chlorophenyl, chlorotolyl, chloroxylyl or chloronaphthyl, chloronitrobenzenes, dinitro compounds such as dinitrobenzene such as ortho-, meta-, and para- dinitrobenzene, alkyl and alkoxy dinitrobenzenes wherein the alkyl group contains up to 10 carbon atoms, aryl and aryloxy dinitrobenzenes wherein the aryl group is any of these mentioned above, chlorodinitrobenzenes, trinitrocompounds such as trinitrobenzene, alkyl and alkoxytrinitrobenzenes, aryl and aryloxytrinitrobenzenes, the substituents being any of these already mentioned and chlorotrinitrobenzenes as well as similarly substituted mono and polynitro derivatives of the naphthalene, diphenyl, diphenylmethane, anthracene and phenanthrene series. Substituted or unsubstituted aliphatic nitrocompounds such as nitromethane, nitroethane, nitropropane, nitrobutane, 2,2-dimethyl nitrobutane, nitrocyclopentane, nitrocyclohexane, nitrocyclobutane, 3-methylnitrobutane, nitrooctadecane, 3-nitropropene-1, phenyl nitromethane, p-bromophenyl nitromethane, p-nitrophenyl nitromethane, p-methoxy phenyl nitromethane, dinitroethane, dinitropropane, dinitrobutane, dinitrohexane, dinitrodecane, dinitrocyclohexane, dinitromethylcyclohexane, di-(nitrocyclohexyl)-methane may also be used, however, the primary, secondary, and cycloaliphatic compounds are less preferred since they yield a mixture of products wherein the urethane may be a minor component. From this group of nitro compounds the aromatic nitrocompounds such as nitrobenzene, nitrotoluene, dinitrobenzene, dinitrotoluene, trinitrobenzene, 4,4'-dinitrodiphenylmethane, p-nitroanisole, p-nitrophenetole, o-nitrophenetole, 2,4 -dinitroanisole, 2,4-dinitrophenetole, 3,5-dinitrobenzylacetate, 1-chloro-2,4-dimethoxy-5-nitrobenzene, 1,4-dimethoxy-2-nitrobenzene, p-nitrophenylnitromethane and the tertiary aliphatic nitrocompounds such as 2-methyl-2-nitropropane and 1-methyl-1-nitro cyclohexane are preferred. Aromatic nitro compounds, i.e. the 2,4-; 2,5-; and 2,6-dinitrotoluenes; meta- and para- dinitrobenzenes and 4,4'-dinitrodiphenylmethane are particularly preferred.

Examples of suitable nitroso compounds are the aromatic nitrosocompounds such as nitrosobenzene, nitrosotoluene, dinitrosobenzene, dinitrosotoluene and the aliphatic nitroso compounds such as nitrosobutane, nitrosocyclohexane and dinitrosomethyl cyclohexane.

Suitable azo compounds have the general formula $R_1-N=N-R_2$, wherein $R_1$ and $R_2$ are either the same or different substituted or unsubstituted alkyl or aryl groups selected from among those already listed in the description of suitable nitro compounds. Azobenzene, nitroazobenzene, chloroazobenzene and alkyl or aryl substituted azobenzenes are particularly preferred.

Suitable azoxy compounds have the general formula

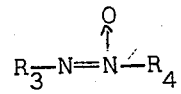

wherein $R_3$ and $R_4$ may be the same or different substituted or unsubstituted alkyl or aryl groups selected from among those already listed in the description of suitable nitro compounds. Azoxybenzene, nitroazoxybenzene, chloroazoxybenzene, alkyl and aryl substituted azoxybenzenes are particularly preferred.

The invention includes the use of any mixture of nitrocompounds, nitroso compounds, azo or azoxy compounds with any mixture of hydroxy compounds and also the use of compounds containing both functions, i.e., hydroxynitro compounds, hydroxy nitroso compounds, hydroxyazo and hydroxyazoxy compounds such as 2-hydroxynitroethane, 2-hydroxynitrosoethane, nitrophenols, nitro naphthols, nitrosophenols, nitrosonaphthols, hydroxyazobenzenes and hydroxyazoxybenzenes. Mixtures of these nitrogen-containing compounds can also be used.

The process of the invention has been found to give the highest yields when employing nitro compounds. It is accordingly preferred to use nitro compounds rather than nitroso, azo or azoxy compounds.

Catalysts for use in this invention include sulfur, selenium, sulfur compounds, selenium compounds and mixtures thereof. Other members of Group VIa metals of the Periodic Table of Elements, such as tellurium metal, have been found to be not as effective as the catalysts shown in the Examples illustrating the process of the present invention.

Selenium metal, preferably in powder form, has been found to be at least as good or better than most selenium compounds. Nevertheless, good yields have been obtained with such compounds as selenium dioxide, selenium trioxide as well as mixtures of the oxides, selenium oxychloride, titanium diselenide and selenium disulfide. Sodium selenite, zinc selenite, zinc selenide, tungsten selenide, selenium sulfide, selenic acid, dimethyl selenide, diethyl selenide, diethyl diselenide, diphenyl selenide and carbonyl selenide can also be employed. Polyselenides such as diethylpolyselenide and dibutylpolyselenide may also be used. Conversions and yields are not necessarily equivalent for all of the selenium compounds, however.

In addition to the somewhat better performance of selenium metal, preferably in powdered form, than many of the selenium compounds mentioned above, selenium tends to provide somewhat better yields than sulfur catalysts. The sulfur catalysts include sulfur itself, various inorganic sulfur compounds, such as hydrogen sulfide, carbonyl sulfide, carbon disulfide, sodium sulfide, potassium sulfide, sulfur dichloride, and organic sulfur compounds such as polysulfides and mercaptans and thioethers having up to 20 carbon atoms, i.e. diethyl polysulfide, dioctylpolysulfide, methyl mercaptan, ethyl mercaptan, cetyl mercaptans and the like may be used.

The catalyst material, as indicated above, can be self-supported or can be deposited on an inert support or carrier for dispersing the catalyst to increase its effective surface. Alumina, silica, carbon barium sulfate, calcium carbonate, asbestos, bentonite, diatomaceous earth, fuller's earth, organic ion exchange resins and analogous materials are useful as carriers for this purpose. A particular example of a supported catalyst is an ion exchange resin containing selenium as the cation and a sulfonic or carboxylic acid function as the anion part of the resin, such as a selenium containing sulfonated macroporous, styrene divinyl benzene resin. Selenium or sulfur containing molecular sieves can also be employed as well as complexes of selenium or sulfur with a ligand.

Base and/or water must also be added to the reaction. Both organic bases and metal salts of carboxylic acids have been found to be effective. Organic bases suitable for the reaction include such amines as triethylamine, pyridine, quinoline, N,N-dimethylaniline, diethylamine, tertiary butyl amine, 1,4-diazobicyclo[2,2,2]octane, polyethylenepolyamines such as N,N′,N′-tetramethyl ethylenediamine, tetramethylene diamine, ethylene diamine and the like. Thus, aliphatic, aliphatic-aromatic and aromatic heterocyclic amines can be employed in the reaction. In addition, the amines can constitute part of a polymer, such as polyvinyl pyridine. Compounds normally considered as weak bases, such as the metal salts of carboxylic acids, sulfonic acids and phosphoric acid, are preferred bases. Examples of such compounds and salts of other weak acids are lithium acetate, sodium acetate, potassium acetate, palladium acetate, ruthenium acetate, the lithium salt of p-toluenesulfonic acid, the lithium salt of methyl sulfonic acid, lithium acid phosphate, the lithium salt of boric acid, calcium acetate, sodium formate, lithium formate and antimony triacetate. The acid salts can be added preformed or can be made in the reaction mixture by adding appropriate quantities of corresponding base and acid. There is not limit on the type of acid used or the corresponding metal oxide or hydroxide employed. Thus, aliphatic, cycloaliphatic and aromatic acids, such as propionic, octanoic, cyclohexane carboxylic, benzoic, oxalic, malonic and the like can be employed. However, oxides or hydroxides of transition metal compounds tend to be more expensive than the alkali and alkaline earth metal hydroxides.

In view of the teaching by the prior art that water should be entirely excluded if maximum yields are to be obtained, the advantageous use of water in the reaction of the present invention was unexpected. For example, the use of sodium acetate containing water of crystallization has been found to result in higher conversion of a nitrogenous compound than the use of anhydrous sodium acetate. In contrast, the prior art teaches the use of strictly anhydrous reactants. While fairly high yields have been obtained using water without base, it is normally desirable to use both base and water.

While the process of the invention can typically be operated effectively in the absence of a solvent, a solvent can be employed. Aromatic solvents such as benzene, toluene, xylene; nitrile solvents such as acetonitrile and benzonitrile; amide type solvents such as N, N-dimethyl formamide and N, N-dimethyl acetamide; aliphatic, alicyclic or aromatic sulfoxide and sulfone solvents, such as dimethyl sulfoxide; aliphatic halogenated hydrocarbons such as 1, 1,2-trichloro-1, 2, 2-trifluoroethane; halogenated aromatic hydrocarbons such as monochlorobenzene, dichlorobenzene and trichlorobenzene; ketones; esters; and ether solvents such as tetrahydrofuran, 1,4-dioxane, 1,2-dimethoxyethane and the like all can be employed as solvents. The ether compounds, for example can be aliphatic, aromatic or heterocyclic, and they can also be either mono or polyethers, or combinations of these compounds. When the organic compound containing at least one hydroxyl group is a liquid under reaction conditions, it sometimes can function as a solvent and is generally preferred.

At higher temperatures and pressures the process of the invention can advantageously be carried out in an inert diluent. The preferred inert diluents are those in which non-gaseous reactants are soluble, including some of the solvents mentioned above. Suitable inert diluents include aliphatic or aromatic hydrocarbons such as n-pentane or toluene, ethers, ketones and esters.

The invention is preferably carried out with at least molar amounts of the hydroxyl-containing compound, carbon monoxide and the nitrogenous organic compound being present. Preferably, however, a molar excess of the hydroxy-containing compound or the nitrogenous compound or both are present.

The mole ratio of the nitrogenous compound to the catalyst can vary over a wide range, i.e., from 5:1 to 2000:1, however, a somewhat more preferred range of moles of nitrogenous compound to catalyst is 10:1 to 1000:1. It will be understood that with reference to the "moles" of catalyst it is meant the element selenium or sulfur and not the compound if the catalyst is a compound. Likewise with respect to the nitrogenous compound reference is to the active nitrogen containing group, e.g. the nitro group, thus if the nitrogenous compound is a dinitro compound, for example, dinitrotoluene, the number of moles would be one half, i.e. the equivalent ratio.

Similarly, with respect to the amount of base employed the mole ratio (based on equivalent nitrogen containing groups in the nitrogenous compound) can vary from 50:1 to 1:10 of the nitrogenous compound to the base. Although water can be omitted entirely and the reaction carried out solely in the presence of organic bases, if water is employed it is preferred to use an amount based on the amount of catalyst. Thus the mole ratio of water to catalyst, i.e. Se or S, can range from as little as about 0.5:1 to as much as 1000:1 or more, but a preferred range is about 1:1 to 200:1. In addition it has been found that at reaction temperatures above 175°C. water alone can be employed in the absence of base although at temperatures below 175° C. a base is employed to obtain good yields of desired products and generally it is preferable to use minor amounts of water in conjunction with the base. Such water can be produced in situ for example when a base such as potassium hydroxide and an acid such as acetic acid are employed in equal molar amounts to give the weakly basic compound, potassium acetate, and water in equi-molar amounts. Generally it is preferred to employ as the additional quantity of base required, an organic base such as pyridine or triethylamine.

It has also been found that although, in general, urethanes are the predominant product of the reaction of this invention certain by-products are obtained. The major by-products are amines and under certain reaction conditions they may become the predominant product. Reaction conditions that promote increased amine production include the use of a sulfur catalyst and/or larger amounts of water. It appears that sulfur catalysts are somewhat more favorable to amine production than selenium catalysts and in some instances somewhat larger amounts of water also favor the amine production.

However, the principal object of this invention is to produce urethanes since amine production would, in general, not be economically favorable compared to commercially used alternatives. Nevertheless, several examples will be shown hereinafter wherein nitrobenzene is converted to aniline and wherein dinitrotoluene is converted to the corresponding mononitromonoamine compounds.

The order of mixing the reactants is not critical and can be varied within the limitations of the equipment employed. A simple procedure is to charge the nitrogenous compound, the organic compound containing at least one hydroxyl group, catalyst, base and/or water into the reaction vessel, introduce the proper amount of carbon monoxide and then heat the mixture to obtain the desired reaction. A suitable pressure vessel, such as an autoclave, which is preferably provided with heating means and agitation means, such as a stirrer or an external rocking mechanism, is employed for the reaction.

Generally, the amount of carbon monoxide in the free space of the reactor is sufficient to maintain the desired pressure as well as to provide a reactant for the process. As the reaction progresses additional carbon monoxide can be fed to the reactor either intermittently or continuously. Although greater and lesser amounts of carbon monoxide can be employed if desired, generally the total amount of carbon monoxide added during the reaction is between about 3 and about 50 moles and preferably between about 8 and about 15 moles of carbon monoxide per non-cyclic group in which the nitrogen atom of the nitrogenous organic compound is directly attached to a single carbon atom and is also attached by a double bond to an oxygen or another nitrogen atom. The highest carbon monoxide requirements are generally utilized in a process in which carbon monoxide is added continuously, but suitable recycle of carbon monoxide containing gas streams greatly reduces the overall consumption of carbon monoxide.

The reaction temperature is generally maintained in the range of from about 60° to about 250° C. and preferably within the range of from about 100° to about 200° C. These temperature ranges permit a convenient rate of reaction to be achieved while avoiding undesirable side reactions. It will be understood, however, that any elevated temperatures below that at which the starting materials or the products decompose can be used. The reaction is carried out, as indicated above, at superatmospheric pressures which is normally between about 10 and about 500 atmospheres, although higher or lower reaction pressures can be employed if other reaction conditions are suitable adjusted. Preferably, however, only moderate carbon monoxide pressures in the range of about 10 to about 100 atmospheres are employed and the reaction is conveniently run at a temperature of below about 200° C. within this pressure range. Accordingly, the process of the present invention can advantageously be operated at lower temperatures and pressures than the temperatures and pressures generally deemed necessary in connection with the use of other catalytic materials which have heretofore been suggested for converting hydroxy compounds and nitrogenous materials into urethane products.

While the reaction of the present invention is normally carried out batchwise, if desired, the reaction can be carried out semi-continuously or even continuously. Ion exchange type catalysts, for example, are particularly suited for continuous reactions. The reaction time is dependent upon the nature of the reactants, temperature, pressure and the type of catalyst employed, as well as the type of equipment which is used. Normally the reaction time is less than 180 minutes and generally the effectiveness of the catalysts of this invention permits the reaction to be completed within a time period between about 10 minutes and about 75 minutes.

After the reaction has been completed, the temperature of the reaction mixture can be dropped to ambient temperature and the pressure vessel vented. The reaction product is then treated by conventional procedures, including filtration, distillation, or other suitable separation techniques, to effect separation of urethane from unreacted starting material, solvent, by-product, catalyst, etc.

The urethane products obtained by the invention contain one or more urethane groups and can be monomeric or polymeric in nature. Thus, the process of the invention can be adopted for the preparation of monourethanes from mononitro compounds, nitroso compounds, azo compounds or azoxy compounds and monohydroxy compounds and adopted for the preparation of polyurethanes from polynitro compounds or polynitroso, nitro or nitroso substituted azo or azoxy compounds and monofunctional hydroxy compounds. The resulting urethane products, in particular those urethanes containing not more than three urethane groups per molecule, can be converted to corresponding isocyanates by suitable means, including thermal and catalytic means.

As has been pointed out amines also can be produced by the method of this invention and monoamines are produced from the mononitro compounds, for example. In general, as has been stated the monourethanes are the predominant product, however, as will be shown in the examples, it is also possible to produce equal or even predominant amounts of the amines. In the case of the dinitro compounds, for example, the amine products are generally the monoamine mononitro compound, i.e. only one of the nitro groups is reduced to the amine.

Additionally, polyurethanes can be obtained by the interaction of polynitro, polynitroso, or nitro substituted azo or azoxy compounds with polyol materials and carbon monoxide. Thus, linear polyurethanes, useful for example as fibers or elastomers, can be obtained directly from diols, dinitro compounds and carbon monoxide or from hydroxynitro compounds and carbon monoxide, while cross-linked polyurethanes, useful as flexible or rigid plastic materials, can be obtained from mixtures of di- or polynitro compounds, diols or polyols and carbon monoxide.

The invention is further illustrated by, but not limited to, the following examples. The reaction set forth in these examples were all run in 316 stainless steel shaking autoclaves. It will be understood, however, that less expensive forms of stainless steel can be used and that if desired equivalent reaction vessels, such as glass-lined vessels, can be employed. Conversions and yields reported by the examples were determined by gas chromatographic analysis and analytical liquid chromatography.

EXAMPLE I

Ten milliliters of nitrobenzene and 15 milliliters of methanol were charged into a 110 milliliter autoclave and maintained under an initial carbon monoxide pressure of 2600 pounds per square inch gage (psig). 1.6 grams of selenium metal and 1.6 milliliters of pyridine were also present in the autoclave. After 45 minutes at a reactor temperature of 200° to 225° C. conversion of the nitrobenzene was 98 per cent and the yield of the resulting urethane product (methyl N-phenyl carbamate) was 88 per cent.

When the identical process was repeated except for maintaining the reactants under the described condition for a period of 3 hours, decomposition occurred and the maximum urethane product yield obtained was only 53 per cent.

EXAMPLE II

Ten milliliters of nitrobenzene and 15 milliliters of methanol were charged into a 110 milliliter autoclave and maintained at a temperature of between about 200° and about 225° C. under an initial carbon monoxide pressure of 2700 psig. 1.6 grams of selenium metal and 1 gram triethylamine were also present in the autoclave. After 45 minutes conversion of the nitrobenzene was 72 per cent and urethane product yield was 74 per cent.

EXAMPLE III

Ten milliliters of nitrobenzene and 15 milliliters of methanol were charged into a 110 milliliter autoclave and maintained there at a temperature of between 200° and 225° C. under an initial carbon monoxide pressure of 2600 psig in the presence of 0.5 gram of selenium metal and 1 gram of sodium acetate trihydrate. After 45 minutes a conversion of 94 per cent of the nitrobenzene had occurred and the urethane product yield was 68 per cent.

When the process of Example III was repeated at a reaction temperature of 180° C. and the reactants maintained under otherwise identical conditions for a period of 90 minutes, conversion of the nitrobenzene dropped off to only 23 per cent. Urethane product yield, however, was 68 per cent.

EXAMPLE IV

Ten milliliters of nitrobenzene and 15 milliliters of methanol were charged into a 110 milliliter autoclave and maintained there at a temperature of 170° C. under an initial pressure of 2600 psig of carbon monoxide in the presence of 1.5 grams selenium metal and 1.6 milliliters of pyridine. After 60 minutes the conversion of nitrobenzene was 22 per cent while the yield of urethane product was 50 per cent.

Similar conversions are obtained when nitrocyclohexane and ethylene glycol are reacted with carbon monoxide under the conditions specified in Example IV.

EXAMPLE V

Ten milliliters of nitrobenzene and 15 milliliters of ethanol were charged into a 110 milliliter autoclave and maintained there at a reaction temperature of 200° to 225° C. and under an initial pressure of 2600 psig of carbon monoxide in the presence of 0.5 gram of selenium metal and 1.6 milliliters of pyridine. After 60 minutes conversion of the nitrobenzene was 10 per cent and urethane product yield was 52 per cent.

Similar conversions are obtained when dinitrosotoluene and resorcinol are reacted with carbon monoxide under the conditions specified in Example V.

EXAMPLE VI

Ten milliliters of nitrobenzene and ten milliliters of methanol were charged into a 110 milliliter autoclave and maintained there at a temperature of 200° to 225° C. under an initial carbon monoxide pressure of 2750 psig in the presence of 2.2 grams of selenium dioxide and 1.6 milliliters of pyridine. After 180 minutes nitrobenzene conversion was 53 per cent and urethane product yield was 63 per cent.

EXAMPLE VII

Ten milliliters of nitrobenzene and 15 milliliters of methanol were charged into a 110 milliliter autoclave and maintained there at a temperature of 200° to 225° C. under an initial carbon monoxide pressure of 2700 psig in the presence of 3.3 grams of selenium oxychloride and 1.6 milliliters of pyridine. After 60 minutes nitrobenzene conversion was 100 per cent and urethane product yield was 42 per cent.

EXAMPLE VIII

Ten milliliters of nitrobenzene and 65 milliliters of methanol were reacted with carbon monoxide in a 110 milliliter rocking autoclave at a temperature of 200° C. under an initial carbon monoxide pressure of 300 psig. One gram of selenium metal was present in the autoclave as catalyst together with 1.5 milliliters of pyridine. After a reaction time of 180 minutes nitrobenzene conversion was 52 per cent and urethane product yield was 76 per cent.

EXAMPLE IX

Five milliliters of nitrobenzene and 65 milliliters of methanol were charged into a 110 milliliter autoclave and maintained under an initial carbon monoxide pressure of 300 psig at a temperature of 200° C. 0.5 gram of selenium metal and 1.5 milliliters of pyridine were employed for the reaction. After 150 minutes nitrobenzene conversion was 30 per cent and urethane product yield was 67 per cent.

EXAMPLE X

Five milliliters of nitrobenzene and 65 milliliters of methanol were charged into a 110 milliliter rocking autoclave and maintained at 200° C. under an initial carbon monoxide pressure of 300 psig. 0.5 gram of selenium metal and 1.6 milliliters of pyridine together with 1 gram of sodium acetate trihydrate were also present in the reaction vessel. After 75 minutes nitrobenzene conversion was 59 per cent and urethane product yield was 50 per cent.

When the identical process of Example X was repeated at an initial carbon monoxide pressure of 500 psig nitrobenzene conversion after 60 minutes was 80 per cent and urethane product yield was 67 per cent.

EXAMPLE XI 2.5 milliliters of nitrobenzene and 65 milliliters of methanol were charged into a 110 milliliter rocking autoclave and maintained under an initial carbon monoxide pressure of 500 psig at a temperature of 200° C. 0.25 gram of selenium metal and 1 gram of sodium acetate trihydrate were employed for the reaction. After 10 minutes reaction time nitrobenzene conversion was 95 per cent and urethane product yield was 78 per cent.

EXAMPLE XII

Five milliliters of nitrobenzene and 30 milliliters of methanol were charged into a 110 milliliter rocking autoclave and maintained at an initial carbon monoxide pressure of 800 psig at a temperature of 200° C. In addition, 0.5 grams of selenium metal, 35 milliliters of tetrohydrofuran and 1 gram of sodium acetate trihydrate were present in the autoclave. After a reaction period of 10 minutes nitrobenzene conversion was 64 per cent and urethane product yield was 74 per cent.

When the reaction of Example XII was repeated at 170° C. a nitrobenzene conversion of 72 per cent and a 70 per cent urethane product yield were obtained after 60 minutes.

EXAMPLE XIII

Five milliliters of nitrobenzene, 30 milliliters of methanol and 35 milliliters of tetrahydrofuran were charged into a 110 milliliter rocking autoclave and maintained at a temperature of 200° C. and under an initial carbon monoxide pressure of 800 psig. In addition, 0.5 gram of selenium metal and 2 grams of sodium acetate trihydrate were present in the autoclave. After 10 minutes nitrobenzene conversion was 70 per cent and urethane product yield was 53 per cent.

When the reaction of Example XIII was repeated except at an operating temperature of 170° C. instead of 200° C. nitrobenzene conversion was 100 per cent and urethane product yield was 74 per cent.

EXAMPLE XIV

Five milliliters of nitrobenzene and 30 milliliters of methanol were charged into a 110 milliliter rocking autoclave which was maintained at an initial carbon monoxide pressure of 800 psig and at a temperature of 170° C. In addition, 35 milliliters of tetrahydrofuran, 0.008 mole of lithium acetate monohydrate and 0.5 gram of selenium metal were present in the autoclave reactor. After a reaction time of 10 minutes nitrobenzene conversion of 94 per cent was obtained and urethane product yield 68 per cent.

By duplicating Example XIV except for maintaining the autoclave at a temperature of 160° C. rather than 170° C. a nitrobenzene conversion of 100 per cent and a urethane product yield of 83 per cent were obtained after a period of 60 minutes.

When the procedure of Example XIV was again duplicated except at an operating temperature of 150° C. rather than 170° C. nitrobenzene conversion was 87 per cent and urethane yield was 85 per cent after 60 minutes.

Finally, when the procedure of Example XIV was duplicated employing a reaction temperature of 130° C. instead of 170° C. nitrobenzene conversion was 89 per cent and urethane product yield was 71 per cent after a period of 140 minutes.

EXAMPLE XV

Five milliliters of nitrobenzene and 30 milliliters of methanol were charged into 110 milliliters rocking autoclave together with 35 milliliters of tetrahydrofuran, 0.1 gram of titanium disulfide and 0.008 mole of lithium acetate monohydrate. The autoclave was maintained at a temperature of 150° C. under an initial carbon monoxide pressure of 800 psig. After 60 minutes a nitrobenzene conversion of 96 per cent and a urethane product yield of 88 per cent were obtained.

When the procedure of Example XV was repeated except for the omission of the lithium acetate monohydrate 0 per cent conversion of nitrobenzene occurred.

EXAMPLE XVI 0.29 grams of lithium hydroxide, 0.72 gram of acetic acid, 10 milliliters of nitrobenzene, 15 milliliters of methanol, 15 milliliters dioxane and 0.5 gram of selenium disulfide were charged into a 110 milliliter autoclave. The autoclave was maintained at 200° C. for 45 minutes under an initial carbon monoxide pressure of 2600 psig. After 45 minutes nitrobenzene conversion was 100 per cent and urethane yield was 96 per cent.

EXAMPLE XVII 0.29 gram of lithium hydroxide, 0.72 gram of acetic acid, 0.5 gram of sulfur, 5 milliliters of nitrobenzene, 30 milliliters of methanol and 35 milliliters of tetrahydrofuran were charged into a 300 milliliter autoclave maintained under an initial carbon monoxide pressure of 800 psig, and at a temperature of 170° C. for a period of 75 minutes. At the end of the period nitrobenzene conversion was 100 per cent and urethane product yield (methyl N-phenyl carbamate) was 75 per cent.

EXAMPLE XVIII

Ten milliliters of nitrobenzene, 65 milliliters of methanol, 1 gram of sulfur, 1.6 milliliters of pyridine and 1 gram of sodium acetate trihydrate were charged into a 300 milliliter autoclave maintained under an initial carbon monoxide pressure of 2600 psig and at a temperature of 200° C. for a time period of 45 minutes. The resulting nitrobenzene conversion was 83 per cent while the urethane product yield was 38 per cent.

When the procedure of Example XVIII was repeated except for using 2 grams of sulfur in place of 1 gram, the nitrobenzene conversion was 94 per cent and urethane product yield was 33 per cent.

EXAMPLE XIX

Ten milliliters of nitrobenzene, 65 milliliters of methanol, 0.5 gram of sulfur and 1 gram of sodium acetate trihydrate were charged into a 300 milliliter autoclave maintained under an initial carbon monoxide pressure of 2600 psig and at a temperature of 200° C. After 45 minutes nitrobenzene conversion was 46 per cent and urethane product yield was 32 per cent.

EXAMPLE XX

Ten milliliters of nitrobenzene, 15 milliliters of methanol, 15 milliliters of dioxane, 0.29 gram of lithium hydroxide, 0.72 gram of acetic acid, 0.10 gram of selenium metal and 0.30 gram of sulfur were charged into a 110 milliliter autoclave maintained under an initial carbon monoxide pressure of 2600 psig and at a temperature of 200° C. for 45 minutes. At the end of the time period a conversion of 75.2 per cent of the nitrobenzene had occurred and product yield of urethane was 82.5 per cent.

EXAMPLE XXI 0.29 gram of lithium hydroxide, 0.72 gram of acetic acid, 0.25 gram of sulfur, 0.25 gram of selenium metal, 10 milliliters of nitrobenzene, 15 milliliters of methanol and 15 milliliters of dioxane were charged into a 110 milliliter autoclave maintained under an initial carbon monoxide pressure of 2600 psig and at a temperature of 200° C. for 45 minutes. A nitrobenzene conversion of 98 per cent and a urethane product yield of 88.4 per cent were obtained as determined by gas chromatographic analysis.

EXAMPLE XXII 0.29 grams of lithium hydroxide, 0.72 gram of acetic acid, 0.5 gram of selenium metal, 5 milliliters of nitrobenzene, and 65 milliliters of methanol were charged into a 300 milliliter autoclave under an initial crbon monoxide pressure of 800 psig and at a temperature of 150° C. for 60 minutes. The resulting nitrobenzene conversion was 100 per cent while urethane product yield was 81.2 per cent.

EXAMPLE XXIII

The following runs were made in a 300 milliliter autoclave with the following materials being charged to the autoclave together with base and/or water:

10 milliliters of nitrobenzene, 30 milliliters of methanol, 35 milliliters of 1,4-dioxane and 0.5 gram of selenium metal.

The reactions were all run at 200° C. for 30 minutes at an initial carbon monoxide pressure of 2600 psig. The following table sets forth the base and/or water employed in the reaction and the conversion of nitrobenzene which occurred:

| Base | Nitrobenzene Conversion (Percent) |
|---|---|
| 1 gram sodium acetate trihydrate | 100 |
| 1 gram sodium acetate (fused) | 8 |
| 1 gram sodium acetate (fused) and 0.2 gram of water | 100 |
| 0.48 gram of sodium hydroxide and 0.72 gram of acetic acid | 91 |
| 1 gram of anhydrous potassium acetate | 50 |
| 1 gram of anhydrous potassium acetate and 0.2 gram of water | 100 |
| no base no water | 9 |
| 0.2 gram of water | 64 |

EXAMPLE XXIV 0.29 gram of lithium hydroxide, 0.72 gram of acetic acid, 0.50 gram of selenium metal, 10.7 grams of nitrosobenzene, 30 milliliters of methanol and 35 milliliters of dioxane were charged into a 300 milliliter autoclave and maintained at 200° C. for 30 minutes under an initial carbon monoxide pressure of 2600 psig.

Analysis of the end of the reaction period showed a 100 per cent conversion and a product yield of 70 per cent.

EXAMPLE XXV 0.29 gram of lithium hydroxide, 0.72 gram of acetic acid, 0.5 gram of selenium metal, 19.8 grams of azoxybenzene, 30 milliliters of methanol and 35 milliliters of dioxane were charged into a 300 milliliter autoclave and maintained at 200° C. for 30 mins. under an initial carbon monoxide pressure of 2600 psig. At the end of the reaction period analysis showed a conversion of 86% and a product yield of 69%.

A number of runs were carried out with 2,4-dinitrotoluene in order to show that corresponding diurethanes are produced by the method of this invention. The examples which follow showing the use of 2,4-dinitrotoluene were selected from a large number of runs wherein conditions or reagents were varied widely thus occassionally resulting in undesirably low yields or a large amount of undesired by-products. The runs described in the following examples produced high conversions and yields of the desired products. All the runs were carried out in a 300 ml, 316 stainless steel shaker, pressure vessl at 800 psig carbon monoxide (initial pressure).

EXAMPLE XXVI

A reaction mixture consisting of 10.9 grams (0.06 moles) of 2,4-dinitrotoluene, 65 ml (1.11 moles) of ethyl alcohol, 0.56 grams (0.01 moles) of potassium hydroxide, 0.60 grams (0.01 moles) of acetic acid and 0.5 grams of selenium metal powder (0.006 moles) were charged to the reaction which was then pressured with the carbon monoxide. At a reaction temperature of 170° C. for 15 minutes, 100 per cent conversion of the dinitrotoluene was obtained and a diurethane yield of 72 per cent was obtained. A similar second run carried out at 150° C. for 60 minutes gave a 100 per cent conversion of a dinitrotoluene and a 72 per cent yield of the diurethane.

EXAMPLE XXVII

A mixture consisting of 10.9 grams (0.06 moles) of 2,4-dinitrotoluene, 35 ml (0.6 moles) of ethyl alcohol, 30 ml (0.21 moles) of triethylamine and 0.5 grams (0.006 moles) of selenium metal powder were charged to the reactor and pressured with carbon monoxide to 800 psig. At a reaction temperature of 150° C. for 60 minutes a 100 per cent conversion of dinitrotoluene was obtained with a yield of 73 per cent of the diurethane and 3 per cent of the monourethane, i.e. 1 nitro group was not converted, giving a combined product yield of 76 per cent.

EXAMPLE XXVIII

A mixture consisting of 10.9 grams (0.06 moles) of 2,4-dinitrotoluene, 35 ml (0.6 moles) of ethyl alcohol, 30 ml (0.37 moles) of pyridine, 0.56 grams (0.01 moles) of potassium hydroxide, 0.60 grams (0.01 moles) of acetic acid and 0.05 grams (0.0006 moles) of selenium metal powder were charged to the reactor which was then pressured to 800 psig with carbon monoxide. At a temperature of 160°C. for 60 minutes a 100 per cent conversion of the dinitrotoluene was obtained and the products were 1 per cent of the 2 isomers of the nitroaminotoluene, 19 per cent of the nitromonourethane and 71 per cent of the diurethane. The total yield or selectivity therefor of the urethanes was 90 per cent. In a similar run 0.072 grams (0.006 moles) of selenium dioxide was used in place of the selenium metal powder as the catalyst and the reaction was carried out at 150° C. for 50 minutes; a 100 per cent conversion of dinitrotoluene was obtained with a product yield of 3 per cent of the nitroaminotoluenes, 34 per cent of the monourethanes and 56 per cent of the diurethanes.

EXAMPLE XXIX

A mixture consisting of 10.9 grams (0.06 moles) of 2,4-dinitrotoluene, 65 ml (1.11 moles) ethyl alcohol, 1.12 grams (0.02 moles) of potassium hydroxide, 1.2 grams (0.02 moles) of acetic acid and 0.05 grams (0.0006 moles) of selenium metal powder were charged to the reactor which was then pressured to 800 psig with carbon monoxide. The reaction was carried out at 150° C. for 20 minutes and a 100 per cent conversion of dinitrotoluene was obtained. A product yield of 70 weight per cent of the monourethane and 19 weight per cent of the diurethane was obtained giving a total selectivity for the urethanes of 89 per cent. In a similar run in which 1.68 grams (0.03 moles) of potassium hydroxide and 1.80 grams (0.03 moles) of acetic acid were employed with the other reagents being the same, a 100 per cent conversion of dinitrotoluene was obtained in 50 minutes at 150°C. with a product yield of 3 per cent of the nitroaminotoluenes, 50 per cent of the monourethanes and 44 per cent of the diurethanes giving a selectivity of 94 per cent for the urethanes.

EXAMPLE XXX

A mixture consisting of 10.9 grams (0.06 moles) of 2,4-dinitrotoluene, 35 ml (0.6 moles) of ethyl alcohol, 15 ml (0.19 moles) of pyridine, 15 ml (0.11 moles) of triethylamine and 0.05 grams of selenium metal powder (0.0006 moles) were charged to the reactor which was then pressured to 800 psig with carbon monoxide. At a reaction temperature of 160° C. for 60 minutes a 100 per cent conversion of the dinitrotoluene was obtained with a product yield of 8 per cent of the nitroaminotoluenes, 63 per cent of the monourethanes and 15 per cent of the diurethanes for a total of 78 per cent of the urethanes. When 0.01 grams of water was added to this same reaction mixture and the reaction carried out at 160°C. for 40 minutes a 98 per cent conversion of dinitrotoluene was obtained with a product yield of 14 per cent of the nitroaminotoluenes, 75 per cent of the monourethanes and 18 per cent of the diurethanes giving a total of 93 per cent for the urethanes.

EXAMPLE XXXI

In order to demonstrate continuous urethane synthesis, a pilot plant scale unit was constructed wherein the liquid reactants were pumped together with a stoichiometric excess of carbon monoxide into a stirred tank reactor operated at 1000 psig. The liquid mixture consisted in a typical run of 10 weight per cent commercial grade dinitrotoluene (80 per cent 2,4-dinitrotoluene and 20 per cent 2,6-dinitrotoluene), 87 weight per cent commercial ethanol (a denatured ethanol containing 2 per cent benzene), 1 weight per cent acetic acid, 1 weight per cent potassium hydroxide and 1 weight per cent selenium dioxide as the soluble catalyst. From the results obtained at various conditions it was found that for this system that the optimum operating conditions were a reaction temperature of 350° F. (177° C) for one-half hour at the 1000 psig pressure level. Under these conditions a dinitrotoluene conversion of 100 per cent was obtained with selectivities to the diurethanes being from 90 to 95 per cent. At temperatures below 350° F., for example 325° F., the conversion becomes a function of the residence time so that reducing the residence time from 1 to ½ to ¼ hour at 325° F. reduces the conversion to 100 per cent to 90 per cent to 76 per cent, respectively. Moreover, operating at less than 350° F. and one-half hour gives lower yields of the diurethane and higher yields of the monourethane. When operating at temperatures above 350° F. and for longer than one-half hour, lower yields of diurethanes are generally obtained together with degraded products. At the optimum conditions the conversion of the dinitrotoluene is rapid even at low catalyst concentrations for example, 90 per cent conversions are obtained with only 0.07 weight per cent of the selenium catalyst in the feed.

These continuous runs demonstrate the excellent commercial feasibility of the instant process.

The following examples are provided to show the production of amines. These are merely illustrative of a large number of runs wherein amines were produced as one of the products. The same type of equipment and methods employed in the previous batch examples were also employed in these runs.

EXAMPLE XXXII

Into a 300 ml, 316 stainless steel rocking autoclave were charged 12.0 grams (0.098 moles) of nitrobenzene, 79 grams (2.46 moles) of methanol, 2.0 grams (0.062 moles) of sulfur (powder), 1.0 grams (0.0073 moles) of sodium acetate trihydrate and 1.6 grams (0.02 moles) of pyridine. The autoclave was pressured to 800 psig initially with carbon monoxide and the reaction mixture maintained at 220° C. for 2 hours.

Upon lowering to ambient temperatures and pressure it was found that 77.4 mole per cent of the nitrobenzene had been converted and that the yield of aniline was 56.6 mole per cent and the yield of the urethane was 6.5 mole per cent.

EXAMPLE XXXIII

In the same 300 ml reactor were charged 10 ml (0.098 moles) of nitrobenzene, 100 ml of methyl alcohol, 1 gram of sodium acetate and 1 gram of powder sulfur. The reactor was pressured with carbon monoxide to 500 psig and the reaction carried out for 10 minutes at 220° C. There was obtained a 35.5 mole per cent conversion of the nitrobenzene with a 30.4 mole per cent selectivity, i.e. yield, to aniline and a 39.3 per cent yield of the urethane.

EXAMPLE XXXIV

A mixture consisting of 10.9 grams of 2,4-dinitrotoluene, 100 ml of ethyl alcohol, 1.28 grams of potassium acetate monohydrate and 0.5 grams of sulfur powder was charged to the 300 ml reactor and pressured to 500 psig with carbon monoxide. The reaction was carried out at 200° C. for 1 hour and a 44.8 mole per cent conversion of the 2,4-dinitrotoluene was obtained. The per cent selectivity based on the dinitrotoluene converted was 40.2 per cent for the two monourethane isomers wherein 1 nitro group remained unconverted, 41 per cent for the nitroaminotoluene isomers and less than about 1.5 per cent for the diurethanes.

EXAMPLE XXXV

A reaction mixture consisting of 10.9 grams of 2,4-dinitrotoluene, 35 ml of ethyl alcohol, 30 ml of pyridine, 1 gram of water and 0.012 grams of selenium metal powder were charged to the reactor which was then pressured to 800 psig with carbon monoxide. The reaction was carried out at 150° C. for 90 minutes and an 83 per cent conversion of the dinitrotoluene was obtained. A 14 per cent yield of the mononitrourethanes was obtained with a trace of the diurethanes and a 78 per cent yield of the nitroaminotoluenes. A second run was carried out under identical conditions to the previous run except that 0.4 grams of water was used and 0.015 grams of selenium powder was employed. A 90 per cent conversion of the dinitrotoluene was obtained and a yield of 55 per cent of the monourethane was obtained with a trace of the diurethane and 46 per cent of the nitroaminotoluenes.

From the foregoing, it will be seen that this invention is well adapted to obtain all of the ends and objects hereinabove set forth, together with other advantages which are obvious and which are inherent to the process. The process is capable of commercially producing high yields of urethane products and amine by-products at relatively low operating temperatures and pressures and at comparatively short reaction times.

Obviously, many modifications and variations of the invention as hereinbefore set forth can be made without departing from the spirit and scope thereof.

We claim:

1. The process for preparing urethanes which comprises reacting at least one hydroxyl group containing compound having the formula $R(OH)_n$ or $R'(OH)_n$ wherein $n$ is from 1 to 3, R is an optionally substituted aliphatic, cycloaliphatic or araliphatic group having from 1 to 20 carbon atoms, and R' is an aromatic group containing 1 to 3 benzenoid rings with carbon monoxide and a nitrogenous organic compound selected from the group consisting of organic nitro, nitroso, azo, and azoxy compounds containing up to 24 carbon atoms, at an elevated temperature and pressure in the presence of a catalyst selected from the group consisting of selenium, sulfur, selenium compounds, sulfur compounds and mixtures thereof and at least one member selected from the group consisting of base and water.

2. The process as claimed in claim 1 wherein the organic compound containing at least one hydroxyl group is ethanol.

3. The process as claimed in claim 1 wherein the nitrogenous organic compound is nitrobenzene.

4. The process as claimed in claim 1 wherein the catalyst is selenium metal.

5. The process as claimed in claim 1 wherein the catalyst is sulfur.

6. The process as claimed in claim 1 wherein the catalyst is a mixture of selenium and sulfur.

7. The process as claimed in claim 1 wherein the nitrogenous organic compound is selected from the group consisting of aromatic nitro compounds, tertiary aliphatic nitro compounds, tertiary cycloaliphatic nitro compounds, nitroso compounds and azo compounds.

8. The process as claimed in claim 7 wherein the nitrogenous organic compound is an aromatic nitro compound.

9. The process as claimed in claim 8 wherein the aromatic nitro compound is a dinitrotoluene.

10. The process for preparing urethanes which comprises reacting at least one hydroxyl group containing compound having the formula $R(OH)_n$ or $R'(OH)_n$ wherein $n$ is from 1 to 3, R is an optionally substituted aliphatic, cycloaliphatic or araliphatic group having from 1 to 20 carbon atoms, and R' is an aromatic group containing 1 to 3 benzenoid rings with carbon monoxide and a nitrogenous organic compound selected from the group consisting of aromatic nitro, tertiary aliphatic nitro, and tertiary cycloaliphatic nitro compounds containing up to 24 carbon atoms, at a temperature of between about 100° and about 200°C. and a pressure between about 10 and 100 atmospheres in the presence of a catalyst selected from the group consisting of selenium, sulfur, selenium compounds, sulfur compounds and mixtures thereof and at least one additional member selected from the group consisting of base and water, wherein the catalyst is present in a molar amount of between 10 to 1 and 1000 to 1 of nitrogenous organic compound to catalyst.

11. The process of preparing urethanes which comprises reacting carbon monoxide with at least one hydroxyl group-containing compound selected from the group consisting of aliphatic and aromatic alcohols and phenols and at least one aromatic nitro compound in the presence of a catalytically effective amount of a selenium or sulfur containing catalyst and at least one member selected from the group consisting of a base and water.

12. The process of preparing urethanes which comprises reacting carbon monoxide with at least one lower aliphatic alcohol and a dinitrotoluene in the presence of a catalyst system comprising a selenium or sulfur containing catalyst and at least one member selected from the group consisting of a base and water.

13. The process as claimed in claim 12 wherein said dinitrotoluene is selected from the group consisting of 2,4-dinitrotoluene; 2,6-dinitrotoluene and mixtures thereof.

14. The process as claimed in claim 12 wherein said dinitrotoluene is selected from the group consisting of 2,4-dinitrotoluene; 2,6-dinitrotoluene and mixtures thereof and said catalyst system comprises selenium metal and a base.

15. The process of preparing urethanes which comprises reacting at an elevated temperature and pressure at least one lower aliphatic alcohol with carbon monoxide and a dinitrotoluene in the presence of a catalyst system of selenium or a selenium compound and a base.

16. The process as claimed in claim 15 wherein said dinitrotoluene is selected from the group consisting of 2,4-dinitrotoluene, 2,6-dinitrotoluene and mixtures thereof.

17. The process as claimed in claim 15 wherein said base is an organic amine.

18. The process as claimed in claim 15 wherein said base is a metal salt of a carboxylic acid.

* * * * *